United States Patent [19]

Willcox

[11] E Patent Number: Re. 32,053

[45] Reissued Date of Patent: Dec. 24, 1985

[54] ARTICULATED RIBBON-GUIDING STRUCTURE

[76] Inventor: Frederick P. Willcox, 565 Oenoke Ridge, New Canaan, Conn. 06840

[21] Appl. No.: 70,457

[22] Filed: Aug. 28, 1979

Related U.S. Patent Documents

Reissue of:

[64] Patent No.: 4,047,607
Issued: Sep. 13, 1977
Appl. No.: 672,699
Filed: Apr. 1, 1976

[51] Int. Cl.[4] ..... B41J 32/00; B41J 33/14

[52] U.S. Cl. ..... 400/208; 400/228; 400/229; 400/248

[58] Field of Search ..... 400/124, 143, 149, 171, 400/172, 188, 195, 196, 196.1, 206.2, 206.4, 208, 208.1, 227, 228, 231, 235.1, 244, 248, 615.2; 33/137, 138; 204/30; 271/2.3; 310/103; 226/97, 196, 197, 198, 199; 242/55, 157 R, 192, 199, 206

[56] References Cited

U.S. PATENT DOCUMENTS

| | | | |
|---|---|---|---|
| 1,862,267 | 6/1932 | Honig | 310/103 |
| 1,962,659 | 6/1934 | Kautz | 310/103 |
| 1,964,280 | 6/1934 | Witchger | 33/138 |
| 1,973,843 | 9/1934 | Buck | 33/137 |
| 2,048,754 | 7/1936 | Putnam | 271/2.3 |
| 2,063,285 | 12/1936 | Wittel | 242/199 |
| 2,074,778 | 3/1937 | Decker | 400/206.4 |
| 2,127,812 | 8/1938 | Gabrielson | 400/228 |
| 2,240,578 | 5/1941 | Rumbutis | 400/206.2 |
| 2,425,967 | 8/1947 | Toggenburger | 400/188 |
| 2,444,797 | 7/1948 | Williams | 310/103 |
| 2,467,881 | 4/1949 | Brumhill | 400/231 |
| 2,479,669 | 8/1949 | Brumhill | 400/231 |
| 2,513,137 | 6/1950 | Brumhill | 400/235.1 |
| 2,609,077 | 9/1952 | Schroder | 400/188 |
| 2,746,691 | 5/1956 | Hoad | 242/55 |
| 2,889,908 | 6/1959 | Korner | 400/188 |
| 2,890,619 | 6/1959 | Waller | 226/196 X |
| 2,986,260 | 5/1961 | Whippo | 400/208 |
| 3,047,121 | 7/1962 | Roggenstein | 400/244 |
| 3,205,997 | 9/1965 | Przybylowicz | 400/227 |
| 3,236,353 | 2/1966 | MacNeill et al. | 400/615.2 |
| 3,272,304 | 9/1966 | Morelli | 400/208.1 |
| 3,318,429 | 5/1967 | Burns et al. | 400/124 |
| 3,349,887 | 10/1967 | Goff, Jr. | 400/208 |
| 3,356,202 | 12/1967 | Goff, Jr. | 400/208 |
| 3,409,113 | 11/1968 | McLean | 400/227 |
| 3,534,847 | 10/1970 | Willcox | 400/143 |
| 3,576,723 | 4/1971 | Angele et al. | 204/30 |
| 3,675,753 | 7/1972 | Perucca | 400/149 |
| 3,692,255 | 9/1972 | Von Behren | 242/192 |
| 3,724,780 | 4/1973 | Wolf | 242/206 |
| 3,726,381 | 4/1973 | Murphy | 400/196.1 |
| 3,731,778 | 5/1973 | Willcox | 400/172 |
| 3,889,795 | 6/1975 | Garberi et al. | 400/208 |
| 3,892,303 | 7/1975 | Willcox | 400/171 |
| 3,941,231 | 3/1976 | Matuck et al. | 400/196.1 |
| 3,977,512 | 8/1976 | Teagarden et al. | 400/195 |
| 3,994,383 | 11/1976 | Best | 400/196.1 |
| 4,047,608 | 9/1977 | Willcox | 400/208 |

FOREIGN PATENT DOCUMENTS

| | | | |
|---|---|---|---|
| 1073054 | 1/1960 | Fed. Rep. of Germany | 400/248 |
| 1106826 | 5/1961 | Fed. Rep. of Germany | 400/248 |
| 1424311 | 1/1969 | Fed. Rep. of Germany | 400/248 |
| 2019648 | 11/1971 | Fed. Rep. of Germany | 400/248 |

OTHER PUBLICATIONS

Word Processing Report 317, "Initial Reaction to QYX Machine is High Praise", Geyer-McAllister Publications, Inc., vol. 14, No. 5, Mar. 1, 1978.

*Primary Examiner*—Ernest T. Wright, Jr.
*Attorney, Agent, or Firm*—William D. Hall

[57] ABSTRACT

A frame-supported ribbon supply and take-up system for typewriters and teleprinters of the type having a carriage-transported printing device. The system incorporates an articulated ribbon-guiding structure connected between the ribbon supply and take-up assembly for guiding and supporting the ribbon along a path of substantially constant length regardless of carriage position. The articulated structure is also incorporated into an easily installable ribbon cartridge.

34 Claims, 3 Drawing Figures

ARTICULATED RIBBON-GUIDING STRUCTURE

Matter enclosed in heavy brackets [ ] appears in the original patent but forms no part of this reissue specification; matter printed in italics indicates the additions made by reissue.

CROSS-REFERENCE TO A RELATED APPLICATION

The improvements to ribbon supply and take-up systems disclosed in this application include material disclosed in my [co-pending] application No. 672,710, filed Apr. 1, 1976 and entitled "Compliant Ribbon-Guiding Structure," [filed on even date herewith] *now U.S. Pat. No. 4,047,608, granted Sept. 13, 1977.*

BACKGROUND OF THE INVENTION

1. Field of the Invention

This invention pertains to typewriter and teleprinter ribbon guidance mechanisms and structures, and to ribbon cartridges.

2. Description of the Prior Art

With the advent of practical and widely used typewriters and teleprinters which have a printing device carriage-transported back and forth along a writing line, it became necessary to provide ribbon supply and take-up systems which also could be transported by the carriage in order to avoid ribbon advance during non-printing movements of the carriage and to obviate the use of special loop formers such as shown in my U.S. Pat. No. 3,534,847, and other contrivances to conserve or length-wise adjust the ribbon as in U.S. Pat. Nos. 2,609,077 and 3,726,381, or adjust a tape as in U.S. Pat. No. 3,236,353. In order to simplify ribbon threading, many of the present systems have taken the form of an easily installed ribbon supply and take-up cartridge or cassette which is also supported by the carriage. Unfortunately these carriage-supported systems have severe drawbacks. They add considerable weight to the carriage, require carriage-supported ribbon feeding and take-up devices which add additional weight and complexity to the carriage, and are limited in ribbon supply capacity due to weight and available space considerations. These drawbacks are eliminated by this invention.

SUMMARY OF THE INVENTION

This invention provides an articulated ribbon-guiding structure for supporting a ribbon between a typewriter printing device carriage that moves back and forth along a writing line and a ribbon supply and take-up assembly which is supported by the machine frame. The articulated structure provides a path for the ribbon web which has substantially constant length, regardless of carriage position, so there is no loss of usable ribbon during non-printing movements of the carriage.

The invention also provides for incorporating the articulated ribbon-guiding structure into a ribbon supply and take-up cartridge which can be supplied as a pre-threaded assembly for ease of installation, and is inexpensive to manufacture. The structure is adjoined to the cartridge.

Inasmuch as the articulated structure is very light in weight, the inertial load presented to the carriage positioning motor is very low, thus permitting faster operation of the machine. Because the use of a frame-supported ribbon supply and take-up system is made practical by this invention, a much larger ribbon supply roll can be used for added convenience.

DESCRIPTION OF THE PREFERRED EMBODIMENTS

Figure 1:
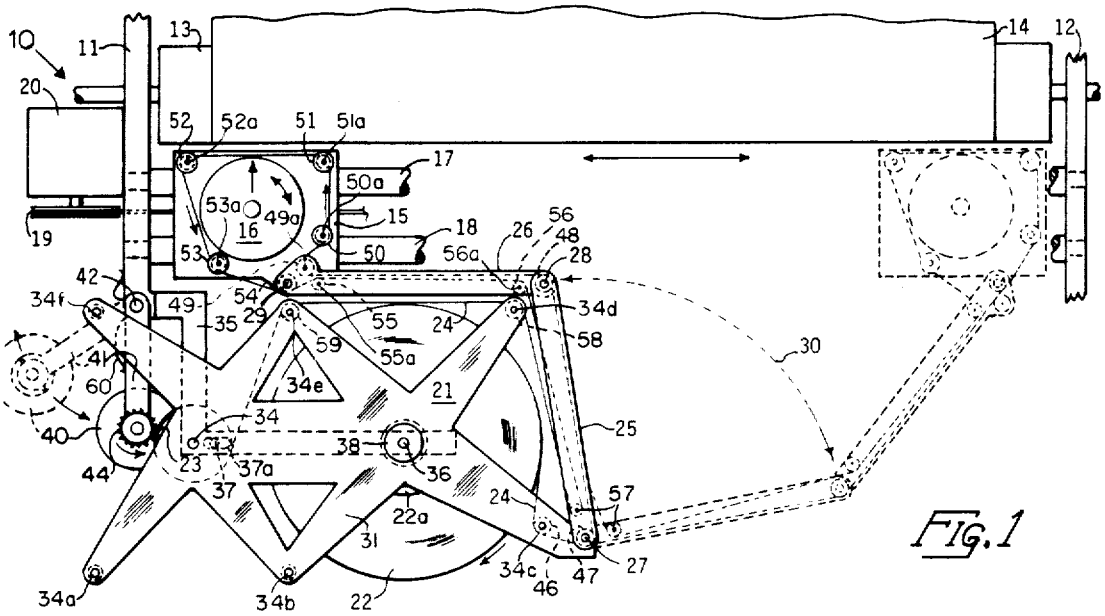
FIG. 1 is a top view showing the general plan of a printer incorporating an articulated ribbon-guiding structure connected between the print carriage and the frame-supported ribbon supply and take-up assembly.

Referring to FIG. 1 of the drawing, a printer is generally indicated by the reference number 10. The left and right side members of the machine frame are indicated at 11 and 12 respectively. The platen 13, journalled in side members 11 and 12, supports a record medium 14. A printing apparatus carriage 15 includes and supports a schematically shown printing mechanism or device 16 and ribbon positioning means (to be described later). Device 16 is positioned or otherwise actuated for character selection and printing by means not shown. Carriage 15 is guided along a writing line by rods 17 and 18 and is moved back and forth by stepping motor 20 acting through cable 19. This generalized printer structure 10 may be of any well-known single element or matrix type, or may be of the type shown in detail in my U.S. Pat. No. 3,534,847, or include the printing apparatus structure which employs individual type chips as shown in my U.S. Pat. Nos. 3,731,778 and 3,892,303, for example.

A ribbon cartridge generally indicated by 21 in FIG. 1, comprises a ribbon supply 22 and take-up assembly 23 for the printer 10. A spool or roll of ribbon 22 and a ribbon take-up spool or drum 23 are retained by the skeletonized casing structure of cartridge 21. The ribbon web 24 is guided to and from carriage 15 by a pair of slender articulated or joined ribbon guide-bearing members generally designated as links 25 and 26. Link 25 is pivoted at one end to cartridge 21 by pivot pin 27, joined at its other end to one end of link 26 by hinge pin 28, and link 26 has its other end connected to the printing apparatus carriage 15 by pivot pin 29. As carriage 15, shown in solid line near a left margin position, is moved to the dotted line position near a right margin position, link 25 rotates about pivot pin 27 and hinge pin 28 follows the arcuate path indicated by arrow 30 while link 26 goes through a combined rotation and translation to take up the dotted line position shown.

Figure 2:
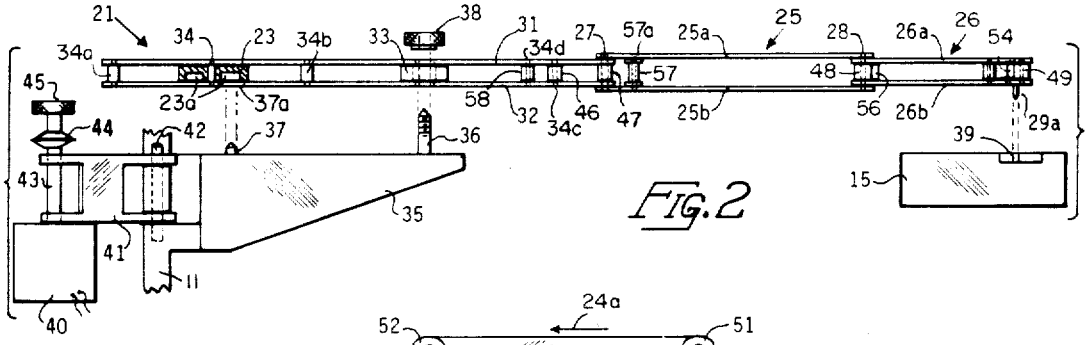
FIG. 2 is a front elevation of the supply and take-up assembly or cartridge with the articulated links, but without the ribbon, to show a preferred form of assembly, as well as showing the cartridge relationship to its frame support and the preferred pivotal connection of the articulated structure to the print carriage. The ribbon take-up drive mechanism is shown in a "swung out" position for cartridge removal or installation.

Referring now to FIG. 2 which, for sake of clarity in showing structure, shows the cartridge 21 without ribbon supply roll 22, but with the links 25 and 26 at the nearly fully extended position, that is, the dotted line position of FIG. 1. Cartridge 21 has upper and lower cover plates 31 and 32 respectively, which are mostly identical. These plates 31 and 32 are separated by a hollow central hub 33, a shouldered pin 34, and by other shouldered pins 34a, 34b, 34c, 34d, and 34e at the ends of the arm-like extremities of plates 31 and 32. Ribbon take-up drum 23, shown sectioned to illustrate its hollow core-like structure, pivots on pin 34. The ribbon supply roll 22, (in FIG. 1), is wound on a central core member 22a which, when the ribbon supply roll 22 is installed in cartridge 21, is free to rotate on hub 33.

Articulated link 25 has upper and lower link bars 25a and 25b respectively, which straddle cartridge plates 31 and 32 at pivot pin 27, and also straddle link 26 at hinge pin 28. Link 26 has upper and lower links bars 26a and 26b respectively, which are free to pivot on hinge pin 28 and are press-fitted onto the small diameter shouldered pivot pin 29. The ribbon guide spools designed by numbers 46 through 59 inclusive will be described later.

FIG. 2 also shows how the replaceable cartridge 21 is supported and retained in the printer 10. In this exploded view, the cartridge 21 is shown just above the support means namely, frame bracket 35. Frame bracket 35 has a threaded pin 36 which engages the hole in hub 33, and a short locating pin 37 which enters an oblong slot 37a, (more clearly seen in dotted line in FIG. 1), in the lower cartridge plate 32 to properly orient the cartridge 21 in the machine. The cored take-up drum 23 has an annular groove 23a in its lower face to clear so much of pin 37 as projects above the surface of plate 32. When the cartridge 21 is so retained, link 26 is positioned so that pivot pin 29, which has an extension 29a, engages a hole 39 in part of carriage 15. A threaded knob 38 engages pin 36 and is used to hold the cartridge 21 in place on bracket 35.

FIGS. 1 and 2 also show one type of ribbon take-up mechanism. In FIG. 2, an incremental drive motor 40 is supported by an H-shaped arm 41 which is hinged to side frame member 11 by pin 42. Motor 40 has an extension shaft 43 journalled in arm 41. The upper end of shaft 43 supports a star wheel 44 which has one or more rows of sharply pointed projections around its periphery to engage the used ribbon web 24 wrapped around take-up drum 23. A knurled knob 45, on the upper end of shaft 43, is used to swing the take-up drive mechanism into or out of drive position, and to manually take up ribbon slack when a new cartridge 21 is installed. The entire take-up drive is urged into engagement with the take-up drum 23 by a spring 60, and can be swung back against pin 34f for cartridge 21 removal and held there by detenting means (not shown), during cartridge exchange.

While a combined incremental ribbon feeding and take-up drive has been shown and described as a preferred structure for example, other mechanisms well-known in the art may be used. Indeed, the ribbon advancing or feeding mechanism can be a separate mechanism, either frame or carriage supported, and the take-up method can be quite different, all as well-known in the art.

Figure 3:
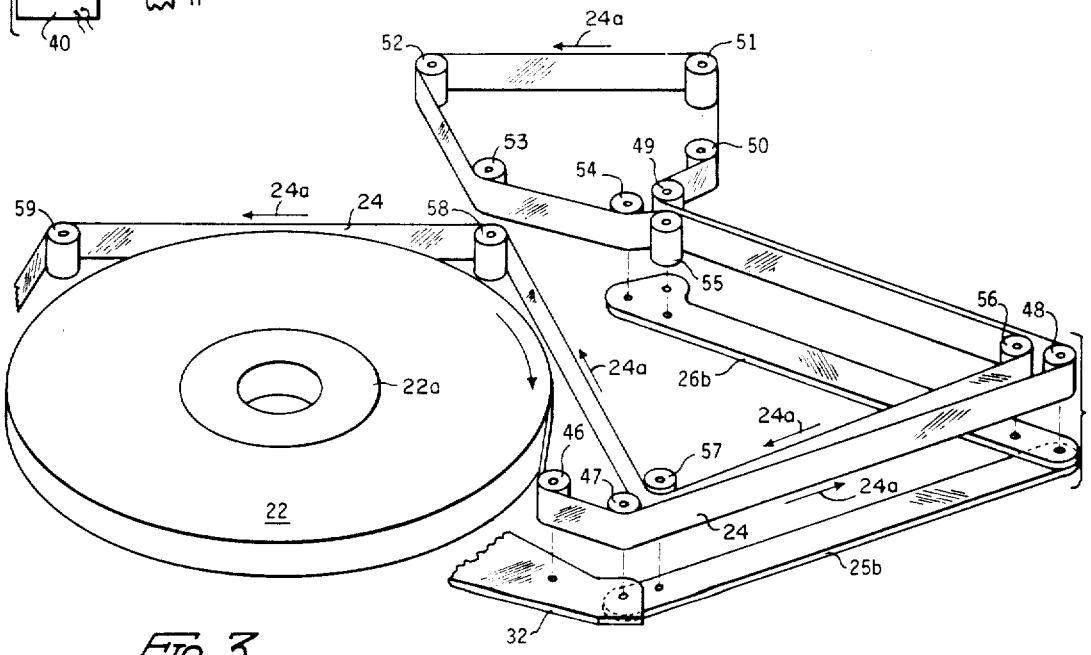
FIG. 3 is an oblique view showing the front and top of part of the structure shown in FIG. 1 and the path of the ribbon web from the supply roll, along the ribbon-guiding rollers to the print carriage, and return along other guide rollers to the take-up area.

FIG. 3 shows the path of the ribbon web 24, of FIG. 1, from the supply and take-up cartridge 21 to the printing area and return. The path of the web 24 around the generalized printing means 16 is shown only schematically because there are a wide variety of ribbon handling devices disclosed in the prior art which can be used to support and position the ribbon web 24 during printing and to direct the ribbon web 24 along the proper path.

For simplicity and clarity of illustration in FIG. 3, only a portion of the structures which support and retain the various ribbon-guiding rollers 46 through 59 inclusive are shown, namely articulated link-supporting extension of the lower cartridge plate 32 and articulated link bars 25b and 26b, and these are further shown exploded downward. The ribbon web 24 leaves the ribbon supply roll 22 and moves in the direction of the arrows 24a placed adjacent the ribbon web path and goes around and along a series of small spools or guide rollers 46 through 59 to the printing area and then back for take-up as shown and now to be described in sequence along the ribbon web 24 path. Stripping roller 46 rotates on a slender shouldered pin 34c which separates plates 31 and 32. Roller 47 rotates on pivot pin 27. Roller 48 rotates on hinge pin 28, and roller 49 rotates about a slender shouldered pin 49a which separates link bars 26a and 26b. Spool-shaped rollers 50, 51, 52, and 53 rotate on pins 50a, 51a, 52a and 53a, respectively, which project from carriage 15. The relative position of rollers 51 and 52 are arbitrarily shown inasmuch as they may be part of, or replaced by, a ribbon vibrator which positions the ribbon web 24 upward and downward during the printing cycle as well-known in the art.

Guide roller 54 rotates about pivot pin 29 which is shouldered and also separates link bars 26a and 26b. Following roller 55 and return corner roller 56 also rotate about respective slender shouldered pins 55a and 56a which separate and align link bars 26a and 26b. End roller 57, which would normally be flanged, is supported on a pin 57a which separates link bars 25a and 25b. Bypass rollers 58 and 59 rotate on respective shouldered pins 34d and 34e which separate respective upper and lower cartridge plates 31 and 32 and guide the returning used ribbon web 24 around supply roll 22 and into line for take-up on drum 23 as shown in FIG. 1. Stripping roller 46 serves as output for the ribbon supply, and bypass roller 59 serves as input to the ribbon take-up receiver. Rollers 50 and 53 serve as the schematic input and output respectively of the means to direct the ribbon web 24 past the carriage-supported printing apparatus 16.

Inasmuch as the outgoing and return paths for the ribbon web 24 cannot both follow the centerlines of the links 25 and 26, the ribbon web 24 loop, from supply spool 22 to take-up drum 23, varies in length as carriage 15 moves back and forth along the writing line. These length changes in the ribbon web 24 loop are substantially compensated for by the judicious location of rollers 50 and 53 on carriage 15, rollers 49, 55, and 56 on link 26, and by roller 57 on link 25. The total web path length may be further refined by adding one or more other rollers at appropriate locations along the web path as desired.

The rollers 46 through 59 used for guiding the ribbon web 24 as just described, are preferably made of plastic material with a very low co-efficient of friction. The rollers 46 through 59 are also preferrably crowned for better tracking of the ribbon web 24. While the rollers 48, 49, 54, 55, 56, and 57 are shown supported in a straddle link assembly, each link 25 and 26 of the articulated pair could just as well be made of a single link bar with the rollers 48, 49, 54, 55, 56, and 57 being supported for rotation on projecting or cantilevered pins. Further, all three joints shown in detail, that is pivots 27, 28, and 29, could, for certain applications, be constructed differently using other well-known types of joints. The cartridge plates 31 and 32 could just as easily be the top and bottom members of a casing or shallow box, and can be easily fabricated of metal or a rigid plastic material that has friction characteristics that are compatable with the ribbon used. If plates 31 and 32 are of metal, it is desirable to coat the ribbon side of each plate 31 and 32 with an anti-friction material such as polytetrafluoroethylene or the like. The apparatus comprising the cartridge 21 and attached articulated arm assembly links 25 and 26 can be easily adapted to automated assembly, including pre-threading with ribbon.

It should be noted that the cartridge assembly 21 can consist of means to support only a ribbon supply roll 22 and the articulated hinge-jointed structure. The used ribbon need not be spooled for take-up as shown but can be disposed of in any well-known manner such as being fed into a take-up box as shown, for example, in FIG. 1 of the referenced co-pending application.

The articulated ribbon-guiding structure links 25 and 26 can be of either metal or rigid plastic. The jointed links 25 and 26 can be fabricated as essentially solid bars with two parallel ribbon slots running the length of each, the bars being hinged together with an integral hinge pin and strap construction, and thusly eliminating most of the guide rollers. In the preferred embodiment shown, only one pair of articulated links 25 and 26 are shown and used for not only guiding the ribbon web 24 to the carriage 15 but back for take-up. In some possible applications it might be desirable to use a second pair of articulated links for guiding the used ribbon back for take-up. Other arrangements are practical and, of course, the links 25 and 26 need not be of equal length. Further, a removable cartridge 21 as shown need not be used at all. A conventional ribbon supply and take-up structure which is supported by the machine frame may be used such as the arrangement shown in FIG. 1 of the referenced co-pending patent application for example.

While the proportions of FIGS. 1 and 2 comtemplate the use of a current standard size ribbon supply roll 22 which is about 4 inches (10 cm.) in diameter, much larger rolls could be used, particularly if the fixed pivot 27 for the articulated link 25 is moved away from a generally central location. Further, the plane of cartridge 21 can be tilted downward to fit under a typewriter keyboard which is hinged for access to the cartridge 21.

If the cartridge 21 and the articulated links 25 and 26 are supplied pre-threaded, as would normally be done, a short loop of ribbon web 24 would be left extending from the free end of link 26 and retained by a temporary clip or other means not shown. When the cartridge 21 is installed and pin 29 at the outer end of the articulated link 26 is engaged with the carriage 15, the temporary clip would be removed and the small loop of ribbon web 24 placed around the guide rollers 50, 51, 52, and 53 which schematically constitute a ribbon directing mechanism. Then any slack or looseness would be taken up by manually rotating knob 45 of the take-up drive (which had been previously swung into engagement with the take-up drim 23 after the cartridge 21 had been placed on the supporting structure).

The articulated ribbon-guiding structure comprising links 25 and 26 has been shown and described in relation to the use of a ribbon which is used for printing. This ribbon may be of any type such as the re-usable inked variety, high yield polymer matrix types, or any single pass type such as a total release type of carbon ribbon. The same general articulated arm structure can also be used to guide and support a correcting ribbon of either the adhesive lift-off type or the printing obliterating cover-up type.

While the invention has been particularly shown and described with reference to the preferred embodiments thereof, it will be understood by those skilled in the art that various changes in form and detail and in applying the concepts of the invention may be made without departing from the spirit and scope thereof.

I claim to have invented:

1. In a printing machine of the kind having a frame, and a printing carriage movable with respect to said frame along a printing path, said printing carriage comprising printing means, the improvement comprising:

ribbon supply means carried by said frame and relatively stationary as compared to said movable printing carriage for storing a supply of ribbon, said ribbon supply means having an output, ribbon directing means on the movable printing carriage for directing said ribbon past the printing means, said ribbon directing means having an input on said movable printing carriage, and ribbon guiding means having one end supported adjacent said output for receiving ribbon from said supply means and another end connected to and moved by said printing carriage for supplying the ribbon to the input of said ribbon directing means, said ribbon guiding means including means that provides a substantially constant feed length between said output of the ribbon supply means and said input of the ribbon directing means irrespective of the position of said movable printing carriage along said printing path.

2. In a printing machine of the kind having a frame, and a printing carriage movable with respect to said frame along a printing path, said printing carriage comprising printing means, the improvement comprising:

ribbon supply means carried by said frame and relatively stationary as compared to said movable printing carriage for storing a supply of ribbon, said ribbon supply means having an output, ribbon directing means on the movable printing carriage for directing said ribbon past the printing means, said ribbon directing means having an input on said movable printing carriage, and ribbon guiding means having one end supported adjacent said output for receiving ribbon from said supply means and another end connected to and moved by said printing carriage for supplying the ribbon to the input of said ribbon directing means, said ribbon guiding means including means that provides a substantially constant feed length between said output of the ribbon supply means and said input of the ribbon directing means irrespective of the position of said movable printing carriage along said printing path, said ribbon guiding means comprising articulated means pivotally supported adjacent said ribbon output and pivotally connected to and moved by said printing carriage.

3. In a printing machine of the kind having a frame, and a printing carriage moveble with respect to said frame along a printing path, said printing carriage comprising printing means, the improvement comprising:

ribbon supply means carried by said frame and relatively stationary as compared to said movable printing carriage for storing a supply of ribbon, said ribbon supply means having an output, ribbon directing means on the movable printing carriage for directing said ribbon past the printing means, said ribbon directing means having an input on said movable printing carriage, and ribbon guiding means having one end supported adjacent said output for receiving ribbon from said supply means and another end connected to and moved by said printing carriage for supplying the ribbon to the input of said ribbon directing means, said ribbon guiding means including means that provides a substantially constant feed length between said output of the ribbon supply means and said input of the ribbon directing means irrespective of the position of said movable printing carriage along said printing path, said ribbon guiding means comprising a linkage made up of first and second links, each link having first and second ends, the first end of the first link being pivotally mounted adjacent said output of said ribbon supply means, the second end of the first link being pivotally attached to the first end of the second link, and the second end of said second link being pivotally attached to said movable printing carriage.

4. In a printing machine of the kind having a frame, and a printing carriage movable with respect to said frame along a printing path, said printing carriage comprising printing means, the improvement comprising:

ribbon supply means carried by said frame and relatively stationary as compared to said movable printing carriage for storing a supply of ribbon, said ribbon supply means having an output, ribbon directing means on the movable printing carriage for directing said ribbon past the printing means, said ribbon directing means having an input on said movable printing carriage, and ribbon guiding means having one end supported adjacent said output for receiving ribbon from said supply means and another end connected to and moved by said printing carriage for supplying the ribbon to the input of said ribbon directing means, said ribbon guiding means including means that provides a substantially constant feed length between said output of the ribbon supply means and said input of the ribbon directing means irrespective of the position of said movable printing carriage along said printing path, said ribbon guiding means comprising linkage means that provides a path of substantially constant length over which the ribbon moves from the output of the ribbon supply means to the input of the ribbon directing means, said linkage means having first and second links each of which links has first and second ends, the first end of the first link being pivotally mounted adjacent said output of said ribbon supply means, the second end of the first link being pivotally attached to the first end of the second link, the second end of said second link being pivotally attached to said movable printing carriage.

5. In a printing machine of the kind having a frame, and a printing carriage movable with respect to said frame along a printing path, said printing carriage comprising printing means, the improvement comprising:

ribbon supply means carried by said frame and relatively stationary as compared to said movable printing carriage for storing a supply of ribbon, said ribbon supply means having an output, ribbon directing means on the movable printing carriage for directing said ribbon past the printing means, said ribbon directing means having an input on said movable printing carriage, said ribbon directing means having a ribbon output, and ribbon guiding means having one end supported adjacent said output for receiving ribbon from said supply means and another end connected to and moved by said printing carriage for supplying the ribbon to the input of said ribbon directing means, said ribbon guiding means including means that provides a substantially constant feed length between said output of the ribbon supply means and said input of the ribbon directing means irrespective of the position of said movable printing carriage along said printing path, said ribbon guiding means including means for guiding the ribbon that passes the printing means from said ribbon output of said ribbon directing means to a given location with respect to said frame.

6. In a printing machine as defined in claim 4, said ribbon means having a ribbon output, and said ribbon guiding means including ribbon translating means for directing the ribbon from said ribbon output of said ribbon directing means along the path eatablished by said first and second links to a position adjacent said first end of said first link.

7. In a printing machine as defined in claim 6, means for advancing the ribbon as printing proceeds comprising means for applying tension to the portion of the ribbon which has returned from said printing carriage along the path provided by said first and second links.

8. In a printing machine as defined in claim 6, ribbon take-up means carried by said frame and relatively stationary as compared to said movable printing carriage, said ribbon take-up means having an input for receiving the ribbon from said position adjacent the first end of said first link, and said take-up means including means for applying tension to the ribbon as printing proceeds to thereby advance the ribbon and pull fresh ribbon from the ribbon supply means toward the printing carriage.

9. In a printing machine of the kind having a frame, and a printing apparatus which employs a ribbon, said printing apparatus movable with respect to said frame along a writing line to produce printing on a record medium supported thereat, the improvement comprising:

ribbon supply and take-up means carried by said frame and relatively stationary as compared to said printing apparatus, for storing a supply of said ribbon and for taking up the ribbon after use, said ribbon supply and take-up means having a ribbon output and a ribbon input respectively, and an articulated ribbon-guiding means having one end pivotally supported adjacent said ribbon output and said ribbon input, and another end pivotally connected to and moved by said printing apparatus, said articulated ribbon-guiding means including means for guiding and supporting ribbon from said ribbon output to said printing apparatus and then back to said ribbon input along a path which is substantially unvarying in length irrespective of the position of the printing apparatus along said writing line.

10. In a printing machine as defined in claim 9, said articulated ribbon-guiding means comprising at least one pair of segments, each segment pair being pivotally joined together.

11. In a printing machine as defined in claim 9, means also supported by said frame for advancing the ribbon as printing proceeds comprising means for applying tension to the portion of the ribbon which has returned from said printing apparatus along the path established by said articulated ribbon-guiding means and further comprising means for effecting the take-up of said returned ribbon.

12. In a printing machine as defined in claim 9, a casing for containing said ribbon supply and take-up means, said casing comprising a ribbon cartridge, and said one end of said articulated ribbon-guiding means is pivotally supported by said casing and said another end includes means for pivotally connecting said another end to said printing apparatus.

13. In a printing machine as defined in claim 9, said articulated ribbon-guiding means comprising a linkage made up of first and second links, each of said links having first and second ends, the first end of the first link being pivotally supported adjacent said ribbon output and said ribbon input, the second end of the first link being pivotally attached to the first end of the second link, and the second end of said second link being pivotally attached to said printing apparatus.

14. A ribbon cartridge for use in a printing machine which machine has (a) stationary means for receiving said cartridge, (b) a printing carriage movable with respect to said stationary means along a printing path, said printing carriage comprising printing means and in which (c) said printing carriage has means for directing a ribbon past the printing means, comprising:

ribbon supply means for storing a supply of ribbon, said ribbon supply means having a ribbon output, a casing for said ribbon supply means including means to enable the casing to be supported by said stationary means, and ribbon guiding means connected to said casing and including means for connection to said printing carriage to guide the ribbon from said ribbon supply means to said printing carriage and then back to a position adjacent said ribbon output, said ribbon guiding means including means for guiding ribbon from said ribbon output to said ribbon directing means along a path of substantially unvarying length irrespective of the position of the printing carriage along said printing carriage path and then back to said position adjacent said ribbon output.

15. A ribbon cartridge as defined in claim 14 in which said printing machine further has ribbon take-up means also supported by said stationary means for advancing and taking up the ribbon as printing proceeds comprising means for applying tension to the portion of ribbon which has returned from said printing carriage along said path of substantially unvarying length to said adjacent position.

16. A ribbon cartridge as defined in claim 15 in which said ribbon guiding means comprises linkage means having first and second links, each of said links having first and second ends, the first end of the first link being pivoted to said casing, the second end of the first link being pivoted to the first end of the second link, and the second end of the second link including means to connect said second end of said second link to said printing carriage.

17. A ribbon cartridge as defined in claim 14 in which said ribbon guiding means comprises linkage means having first and second links, each of said links having first and second ends, the first end of the first link being pivoted to said casing, the second end of the first link being pivoted to the first end of the second link, and the second end of the second link including means to enable said second end of the second link to be pivotally connected to said printing carriage.

18. A ribbon cartridge as defined in claim 14 in which said ribbon guiding means is an articulated ribbon-guiding means having one end pivotally connected to said casing and having another end, including means to enable said another end to be pivotally connected to said printing carriage.

19. A ribbon cartridge as defined in claim 18 in which said articulated ribbon-guiding means comprises at least one pair of segments, and the two segments of a pair are pivotally connected together.

20. A ribbon cartridge for use in a printing machine which machine has (a) stationary means for receiving said cartridge, (b) a printing carriage movable with respect to said stationary means along a printing path, said printing carriage comprising printing means, and in which (c) said printing carriage has means for directing a ribbon past the printing means, said ribbon directing means having an output, comprising:

a ribbon supply means for storing a supply of ribbon, said ribbon supply means having a ribbon output, ribbon take-up receiving means for storing used ribbin, said ribbon take-up receiving means having a ribbon input, a casing for said ribbon supply means and said ribbon take-up receiving means, said casing including means enabling the casing to be supported by said stationary means, and ribbon guiding means connected to said casing and including means enabling the ribbon guiding means to be connected to said printing carriage, to guide the ribbon from said supply means to said printing carriage and then back to said ribbon take-up and receiving means, said ribbon guiding means including means for guiding the ribbon from said output of said ribbon supply means to said ribbon directing means along a path of substantially unvarying length irrespective of the position of said printing carriage along the printing path and then guiding the ribbon from said output of said ribbon directing means back to said ribbon input.

21. A ribbon cartridge as defined in claim 20 in which said printing machine further has means, also supported by said stationary means, for advancing the ribbon as printing proceeds comprising means for applying tension to the portion of the ribbon which has returned from said printing carriage back to said ribbon input and further comprising means for effecting the take-up of said returned ribbon.

22. A ribbon cartridge as defined in claim 21, said ribbon guiding means comprising articulated means having one end pivotally attached to said casing and another end including means enabling said another end to be pivotally connected to said printing carriage and movable thereby.

23. A ribbon cartridge as defined in claim 22, said articulated means comprising at least one pair of segments and in which the two segments of a pair are pivotally connected together.

24. A ribbon cartridge as defined in claim 20, said ribbon guiding means comprising articulated means having one end pivotally connected to said casing and another end including means enabling said another end to be pivotally connected to said printing carriage and movable thereby.

25. A ribbon cartridge as defined in claim 24, said articulated means comprising at least one pair of segments, and in which the two segments of a pair are pivotally connected together.

26. A ribbon cartridge as defined in claim 20, said ribbon guiding means comprising a linkage means having first and second links, each of said links having first and second ends, the first end of the first link being pivoted to said casing, the second end of the first link being pivoted to the first end of the second link, and the second end of the second link including means to enable said second end to the second link to be connected to said printing carriage.

27. In a printing machine of the kind having a frame, and a printing carriage movable with respect to said frame along a printing path, said printing carriage comprising printing means, the improvement comprising:

ribbon supply means carried by said frame and relatively stationary as compared to said movable printing carriage for storing a supply of ribbon, said ribbon supply means having an output, ribbon directing means on the movable printing carriage for directing said ribbon past the printing means, said ribbon directing means having an input on said movable printing carriage, and ribbon guiding means, which continuously extends between said output of said ribbon supply means and said input of said ribbon directing means and guides the ribbon along a path conforming to the configuration of said ribbon guiding means, having one end supported adjacent said output of said ribbon supply means for receiving ribbon from said supply means and another end connected to and moved by said printing carriage for supplying the ribbon to the input of said ribbon directing means to thereby change the configuration of said ribbon guiding means as the printing carriage moves along said printing path, said ribbon guiding means including means that provides a substantially constant feed length between said output of the ribbon supply means and said input of the ribbon directing means irrespective of the position of said movable printing carriage along said printing path.

28. In a printing machine as defined in claim 27, including means for incrementally advancing said ribbon through said ribbon guiding means as printing proceeds during the travel of said printing carriage along said printing path.

29. In a printing machine of the kind having a frame, and a printing carriage movable with respect to said frame along a printing path, said printing carriage comprising printing means, the improvement comprising:

ribbon supply means carried by said frame and relatively stationary as compared to said movable printing carriage for storing a supply of pliant ribbon, said ribbon supply means having an output, ribbon directing means on the movable printing carriage for directing said ribbon past the printing means, said ribbon directing means having an input on said movable printing carriage, and flexible ribbon-guide-means for guiding the pliant ribbon from the ribbon supply means to the ribbon directing means, said flexible ribbon-guide-means including means for guiding the ribbon from said output to said input along a path of *substantially* unvarying length irrespective of the position of said movable printing carriage along its printing path.

30. In a printing machine of the kind having a frame, and a printing apparatus which employs a pliant ribbon, said printing apparatus movable with respect to said frame along a writing line to produce printing on a record medium supported thereat, the improvement comprising:

ribbon supply and take-up means carried by said frame and relatively stationary as compared to said printing apparatus, for storing a supply of said ribbon and for taking up the ribbon after use, said ribbon supply and take-up means having a ribbon output and a ribbon input, and flexible ribbon-guide-means connected between said ribbon supply and take-up means and said printing apparatus, said flexible ribbon-guide-means including means for guiding [and] *said* ribbon from said ribbon output to the printing apparatus and then back to said ribbon input along a path of *substantially* unvarying length irrespective of the position of the printing apparatus along said writing line.

31. A ribbon cartridge for use in a printing machine which machine has stationary means for receiving said cartridge, and has a printing apparatus which is movable with respect to said stationary means along a writing line to produce printing on a record medium supported thereat, comprising:

ribbon supply means for storing a supply of ribbon, said ribbon supply means having a ribbon output, a casing for said ribbon supply means supportable by said stationary means, and flexible ribbon-guide means attached to said casing and connectable to said printing apparatus to guide the ribbon from said output to said printing apparatus and then back to a position adjacent said output along a path of *substantialy* unvarying length irrespective of the position of the printing apparatus along said writing line.

32. A ribbon cartridge for use in a printing machine which machine has stationary means for receiving said cartridge, and has a printing apparatus which is movable with respect to said stationary means along a writing line to produce printing on a record medium supported thereat, comprising:

ribbon supply means for storing a supply of ribbon, said ribbon supply means having a ribbon output, ribbon take-up receiving means for storing used ribbon, said ribbon take-up receiving means having a ribbon input, a casing for said ribbon supply means and said ribbon take-up receiving means, said casing supportable by said stationary means, and flexible ribbon-guide-means attached to said casing and connectable to said printing apparatus for guiding the ribbon from said output to the printing apparatus and then back to said input along a path of *substantially* unvarying length irrespective of the position of the printing apparatus along said writing line.

*33. A ribbon cartridge for use in a printing machine which machine has stationary means for receiving said cartridge, and has a printing apparatus which is movable with respect to said stationary means along a writing line to produce printing on a record medium supported thereat, comprising:*

*ribbon supply means for storing a supply of ribbon, said ribbon supply means having a ribbon output;*

*a casing for said ribbon supply means operatively supportable by said stationary means; and*

*ribbon-guide-means attached to said casing and connectable to said printing apparatus to guide the ribbon from said output to said printing apparatus along a path of substantially unvarying length irrespective of the position of the printing apparatus along said writing line.*

*34. A ribbon cartridge for use in a printing machine which machine has (a) stationary means for receiving said cartridge, (b) a carriage movable, with respect to said stationary means along a stationary writing line, and (c) a printing apparatus for performing printing and which guides printing ribbon past said apparatus to print on a record medium supported thereat, (d) said stationary means including stationary driving means which is capable of performing a driving operation as printing proceeds and which is positioned closely adjacent said cartridge when said cartridge has been received by said stationary means, said cartridge comprising:*

*ribbon take-up means for taking-up said printing ribbon, said take-up means having a ribbon input;*

*said cartridge including a casing, for said ribbon take-up means, configured to be received by said stationary means; and*

*ribbon-guide means attached to said casing and connectable to said printing apparatus to guide the ribbon from said printing apparatus to said input along a path of substantially unvarying length irrespective of the position of the printing apparatus along said writing line,*

*said take-up means including an element carried by said casing and which engages said driving means so as to be driven thereby when said stationary means has received said cartridge, said element when driven by said driving means applying a driving force to said take-up means, so that ribbon is pulled along said ribbon-guide to said take-up means.*

* * * * *